United States Patent
Vandenbelt et al.

(10) Patent No.: US 7,438,799 B2
(45) Date of Patent: *Oct. 21, 2008

(54) PORTABLE, REFILLABLE WATER DISPENSER SERVING BATCHES OF WATER PURIFIED OF ORGANIC AND INORGANIC POLLUTANTS

(75) Inventors: Rudy A. Vandenbelt, Ottawa (CA); Jeremy Hamilton, Celemis (CA); Troy C. Anderson, Marblehead, MA (US); Charles R. Lanning, Ottawa (CA)

(73) Assignee: Headwaters R & D, Inc., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/163,160

(22) Filed: Oct. 7, 2005

(65) Prior Publication Data

US 2006/0231476 A1    Oct. 19, 2006

Related U.S. Application Data

(63) Continuation of application No. 10/726,779, filed on Dec. 3, 2003, now Pat. No. 6,953,523.

(51) Int. Cl.
*C02F 1/28*    (2006.01)
*C02F 1/32*    (2006.01)
*C02F 1/42*    (2006.01)
*C02F 9/00*    (2006.01)

(52) U.S. Cl. .......................... 210/85; 210/138; 210/141; 210/202; 210/257.1; 210/262; 210/266; 210/282; 210/739; 210/748

(58) Field of Classification Search ................. 210/748, 210/85, 91, 93, 138, 141, 143, 202, 257.1, 210/262, 266, 282
See application file for complete search history.

(56) References Cited

U.S. PATENT DOCUMENTS

| | | | | |
|---|---|---|---|---|
| 795,408 | A * | 7/1905 | Nebinger | 222/129 |
| D163,117 | S * | 5/1951 | Hobbs | D7/318 |
| D173,455 | S * | 11/1954 | Reinecke et al. | D7/317 |
| 2,805,561 | A * | 9/1957 | Emmert et al. | 222/131 |
| 3,512,686 | A * | 5/1970 | Penniman | 222/472 |
| 3,747,767 | A * | 7/1973 | Hankammer | 210/282 |
| 3,823,824 | A * | 7/1974 | Close | 210/86 |
| 3,861,565 | A * | 1/1975 | Rickmeier, Jr. | 222/131 |
| 4,306,971 | A * | 12/1981 | Hankammer | 210/282 |
| 4,623,457 | A * | 11/1986 | Hankammer | 210/237 |
| D287,325 | S * | 12/1986 | Schmidt | D10/46.2 |
| 4,653,671 | A * | 3/1987 | Duffy et al. | 222/105 |
| 4,655,373 | A * | 4/1987 | Essen | 222/465.1 |
| 4,666,600 | A * | 5/1987 | Hankammer | 210/266 |

(Continued)

FOREIGN PATENT DOCUMENTS

WO    WO 95/04705    2/1995

(Continued)

*Primary Examiner*—Robert James Popovics
(74) *Attorney, Agent, or Firm*—Albert Peter Durigon

(57) ABSTRACT

A portable, refillable water dispenser serving batches of water purified of organic and inorganic pollutants includes a portable, refillable and hand-holdable vessel for holding and pouring water having a spout and, inside the portable, refillable and hand-holdable vessel, moving water and still water processing module cooperative to remove inorganic and organic pollutants from water received batchwise by the vessel.

4 Claims, 5 Drawing Sheets

U.S. PATENT DOCUMENTS

| | | | |
|---|---|---|---|
| 4,762,613 A | | 8/1988 | Snowball |
| 4,764,274 A | * | 8/1988 | Miller ........................ 210/232 |
| 4,776,956 A | * | 10/1988 | Gannaway ................. 210/282 |
| 4,828,692 A | * | 5/1989 | Peranio ...................... 210/123 |
| 4,895,648 A | * | 1/1990 | Hankammer ............... 210/188 |
| 4,948,499 A | * | 8/1990 | Peranio ...................... 210/180 |
| 4,969,996 A | * | 11/1990 | Hankammer ............... 210/282 |
| D312,863 S | * | 12/1990 | Hankammer ............... D23/209 |
| 4,995,975 A | * | 2/1991 | Jacquot et al. ............. 210/266 |
| 4,998,228 A | * | 3/1991 | Eger et al. ................... 368/10 |
| D318,095 S | * | 7/1991 | Hankammer ............... D23/212 |
| 5,039,402 A | | 8/1991 | Himelstein |
| 5,049,272 A | * | 9/1991 | Nieweg ...................... 210/266 |
| 5,076,922 A | * | 12/1991 | DeAre ........................ 210/282 |
| D325,768 S | * | 4/1992 | Hankammer ............... D23/212 |
| 5,139,666 A | * | 8/1992 | Charbonneau et al. ...... 210/264 |
| D332,028 S | * | 12/1992 | Melamed et al. ............ D7/317 |
| 5,190,643 A | * | 3/1993 | Duncan et al. ............... 210/85 |
| D335,608 S | * | 5/1993 | Arnold ........................ D7/317 |
| D336,760 S | * | 6/1993 | Raunkjaer .................. D23/209 |
| D337,690 S | * | 7/1993 | Bunn et al. .................. D7/317 |
| D337,691 S | * | 7/1993 | Raunkjaer .................. D7/317 |
| 5,225,078 A | * | 7/1993 | Polasky et al. .............. 210/264 |
| 5,238,559 A | * | 8/1993 | Nieweg ...................... 210/264 |
| 5,328,597 A | * | 7/1994 | Boldt et al. ................... 210/87 |
| D352,212 S | * | 11/1994 | Burton ......................... D7/629 |
| 5,486,285 A | * | 1/1996 | Feeney ......................... 210/85 |
| D370,711 S | * | 6/1996 | Serenko et al. ............. D23/209 |
| 5,536,394 A | * | 7/1996 | Lund et al. ................... 210/87 |
| 5,536,396 A | * | 7/1996 | Mudra et al. ................. 210/94 |
| D374,911 S | * | 10/1996 | Kahana ..................... D23/209 |
| 5,628,897 A | * | 5/1997 | Phelan ........................ 210/94 |
| 5,637,214 A | * | 6/1997 | Kahana ...................... 210/282 |
| 5,665,224 A | * | 9/1997 | Levene et al. ................ 210/85 |
| D386,041 S | * | 11/1997 | Tanner et al. ................ D7/319 |
| D388,655 S | * | 1/1998 | Flom et al. ................... D7/319 |
| 5,785,844 A | * | 7/1998 | Lund et al. ................... 210/85 |
| 5,811,004 A | * | 9/1998 | Robertson et al. ........... 210/482 |
| D400,392 S | * | 11/1998 | Robertson et al. ........... D7/319 |
| 5,830,360 A | * | 11/1998 | Mozayeni ................... 210/651 |
| 5,846,418 A | * | 12/1998 | Thompson et al. .......... 210/266 |
| 5,855,160 A | * | 1/1999 | Shen ............................ 99/279 |
| D406,003 S | * | 2/1999 | Tanner et al. ................ D7/319 |
| 5,873,995 A | * | 2/1999 | Huang et al. ................. 210/87 |
| 5,882,507 A | * | 3/1999 | Tanner et al. ................. 210/85 |
| 5,900,138 A | * | 5/1999 | Moretto ........................ 210/85 |
| D415,922 S | * | 11/1999 | Kawasaki et al. ............ D7/317 |
| D419,027 S | * | 1/2000 | Haslem et al. ............... D7/319 |
| D421,361 S | * | 3/2000 | Coulson et al. .............. D7/319 |
| 6,074,550 A | * | 6/2000 | Hofmann et al. ............. 210/87 |
| 6,103,114 A | * | 8/2000 | Tanner et al. ................ 210/232 |
| D432,205 S | * | 10/2000 | Tien Lin ..................... D23/209 |
| 6,193,894 B1 | * | 2/2001 | Hollander ................... 210/748 |
| 6,202,541 B1 | * | 3/2001 | Cai ............................... 99/286 |
| D440,110 S | * | 4/2001 | Tanner et al. ................ D7/319 |
| 6,224,751 B1 | * | 5/2001 | Hofmann et al. ............. 210/85 |
| 6,227,382 B1 | * | 5/2001 | Cutler et al. ................. 210/473 |
| 6,238,552 B1 | * | 5/2001 | Shannon ...................... 210/94 |
| D444,662 S | * | 7/2001 | McGrath et al. ............. D7/319 |
| D444,987 S | * | 7/2001 | McGrath et al. ............. D7/319 |
| 6,254,768 B1 | * | 7/2001 | Dulieu et al. ................. 210/91 |
| D450,531 S | * | 11/2001 | McGrath et al. ............. D7/392 |
| D454,469 S | * | 3/2002 | Jalet et al. .................... D7/318 |
| 6,387,260 B1 | * | 5/2002 | Pimenov et al. ............. 210/282 |
| 6,405,875 B1 | * | 6/2002 | Cutler ......................... 210/477 |
| D459,941 S | * | 7/2002 | Miller ......................... D7/392 |
| 6,423,224 B1 | * | 7/2002 | Tanner et al. ................ 210/247 |
| 6,428,687 B1 | * | 8/2002 | Moretto ...................... 210/100 |
| 6,440,302 B1 | * | 8/2002 | Leipziger .................... 210/223 |
| 6,524,477 B1 | * | 2/2003 | Hughes ....................... 210/282 |
| 6,565,743 B1 | * | 5/2003 | Poirier et al. .................. 210/85 |
| 6,572,769 B2 | * | 6/2003 | Rajan et al. ................. 210/266 |
| 6,599,427 B2 | * | 7/2003 | Nohren et al. ............... 210/660 |
| 6,602,406 B1 | * | 8/2003 | Nohren et al. ............... 210/136 |
| 6,638,426 B1 | * | 10/2003 | Fritter et al. ................. 210/266 |
| 6,649,045 B2 | * | 11/2003 | Tanner et al. ................. 210/85 |
| 6,651,824 B2 | * | 11/2003 | Miller ......................... 210/464 |
| D497,195 S | * | 10/2004 | Nishi et al. ................. D23/209 |
| D501,755 S | * | 2/2005 | Namur ........................ D7/397 |
| 6,860,992 B2 | * | 3/2005 | Chau ........................... 210/251 |
| 6,881,327 B2 | * | 4/2005 | Tanner et al. ................. 210/85 |
| 6,953,523 B2 | * | 10/2005 | Vandenbelt et al. ........... 210/85 |
| D514,868 S | * | 2/2006 | Achenbach et al. .......... D7/318 |
| D520,597 S | * | 5/2006 | Witte ......................... D23/209 |
| D522,304 S | * | 6/2006 | Huang ......................... D7/317 |
| D523,280 S | * | 6/2006 | Bertulis ...................... D7/317 |
| 7,107,838 B2 | * | 9/2006 | Chai et al. .................. 73/304 R |
| 7,201,840 B2 | * | 4/2007 | Tsataros et al. ............... 210/85 |
| 7,276,161 B2 | * | 10/2007 | Rajan et al. ................. 210/266 |
| 7,297,283 B2 | * | 11/2007 | Ali .............................. 210/767 |
| 2002/0020673 A1 | * | 2/2002 | Nohren et al. ............... 210/660 |
| 2002/0060175 A1 | * | 5/2002 | Conrad et al. ................ 210/85 |
| 2002/0060176 A1 | * | 5/2002 | Mierau et al. ................ 210/94 |
| 2002/0060177 A1 | * | 5/2002 | Conrad ....................... 210/203 |
| 2002/0060189 A1 | * | 5/2002 | Conrad ....................... 210/739 |
| 2002/0060190 A1 | * | 5/2002 | Conrad ....................... 210/739 |
| 2002/0066698 A1 | * | 6/2002 | Brunner ...................... 210/474 |
| 2002/0125187 A1 | * | 9/2002 | Tanner et al. ................ 210/418 |
| 2002/0134715 A1 | * | 9/2002 | Tanner et al. ................. 210/85 |
| 2003/0159979 A1 | * | 8/2003 | Chau ........................... 210/282 |
| 2004/0060873 A1 | * | 4/2004 | Yanou et al. ................ 210/660 |
| 2004/0094465 A1 | * | 5/2004 | Rajan et al. ................. 210/266 |
| 2004/0149642 A1 | * | 8/2004 | Vandenbelt et al. .......... 210/282 |
| 2004/0173507 A1 | * | 9/2004 | Tanner et al. ................. 210/85 |
| 2005/0109683 A1 | * | 5/2005 | Joyce et al. ................... 210/94 |
| 2005/0133427 A1 | * | 6/2005 | Rinker et al. ................ 210/209 |
| 2005/0139540 A1 | * | 6/2005 | Mierau et al. ............... 210/435 |
| 2005/0252844 A1 | * | 11/2005 | Chau ........................... 210/282 |
| 2006/0000763 A1 | * | 1/2006 | Rinker et al. ................ 210/282 |
| 2006/0096925 A1 | * | 5/2006 | Roffman et al. ............. 210/660 |
| 2006/0157399 A1 | * | 7/2006 | Vandenbelt et al. .......... 210/282 |
| 2006/0163148 A1 | * | 7/2006 | Hengsperger et al. ....... 210/473 |
| 2006/0163169 A1 | * | 7/2006 | Eckhardt et al. ............ 210/748 |
| 2006/0163174 A1 | * | 7/2006 | Namespetra et al. ........ 210/760 |
| 2006/0191824 A1 | * | 8/2006 | Arett et al. .................... 210/85 |
| 2006/0226064 A1 | * | 10/2006 | Beckman et al. .......... 210/323.1 |
| 2006/0231476 A1 | * | 10/2006 | Vandenbelt et al. .......... 210/266 |
| 2006/0249442 A1 | * | 11/2006 | Yap et al. .................... 210/470 |
| 2006/0260990 A1 | * | 11/2006 | Joyce et al. ................... 210/85 |

FOREIGN PATENT DOCUMENTS

| | | |
|---|---|---|
| WO | WO 00/78191 | 12/2000 |
| WO | WO 2004052789 A2 * | 6/2004 |
| WO | WO 2005066077 A1 * | 7/2005 |
| WO | WO 2006/043283 | 4/2006 |

\* cited by examiner

PORTABLE, REFILLABLE WATER DISPENSER SERVING BATCHES OF WATER PURIFIED OF ORGANIC AND INORGANIC POLLUTANTS

CROSS-REFERENCE TO RELATED APPLICATIONS

This application is a continuation application of U.S. Nonprovisional application Ser. No. 10/726,779, filed Dec. 3, 2003 now U.S. Pat. No. 6,953,523, of the same inventive entity as herein, incorporated herein by reference.

FIELD OF THE INVENTION

This invention is drawn to the field of water purification, more particularly, to point of use water purifiers, and more particularly, to a novel portable, refillable water dispenser serving batches of water purified of organic and inorganic pollutants.

BACKGROUND OF THE INVENTION

Systems that treat water for regional consumption such as municipal waterworks and systems that treat water for point of use consumption are the two basic types of systems by which water may be treated to remove impurities. The municipal systems, of course, afford no purification of other than "city" water, such as well water, and organic and inorganic impurities often remain in "city" water notwithstanding filtration, UV treatment, ozone treatment or treatment by any of the other water purification techniques well-known to those of skill in the art. The point of use systems for their part may be locally installed or portable. However, point of use systems installed into existing plumbing are typically line-powered, requiring line voltage and current for the treatment of water, and often involve an expense beyond the budget of many consumers for equipment acquisition, installation services and periodic maintenance. The portable point of use systems on the other hand are often cumbersome, suitcase-sized units that are difficult to use, involving multiple manual treatment steps, or do not remove both inorganic and organic impurities, and sometimes are no less expensive to acquire and maintain than their installed counterparts.

SUMMARY OF THE INVENTION

It accordingly is the general object of the present invention to provide a novel point of use water purifier, and more particularly, to provide a portable, refillable water dispenser that itself serves batches of water purified of both organic and inorganic pollutants. As used herein, the term "organic" in the phrase "organic pollutants" refers to "living organisms" such as bacteria, and the term "inorganic" in the phrase "inorganic pollutants" refers to "non-living, organic (carbon) or inorganic compounds."

In general terms, the present invention contemplates a portable, refillable water dispenser serving batches of water purified of organic and inorganic pollutants that includes a portable, refillable and hand-holdable vessel for holding and pouring water having a spout and, inside the portable, refillable and hand-holdable vessel, moving water and still water processing modules cooperative to remove inorganic and organic pollutants from water received batchwise by said vessel. The module processing moving water disposed inside the vessel is adapted to receive water to be processed batchwise, and is further adapted to cause the water to be processed received batchwise to move through a flow-through filter to remove inorganic impurities and then out of said module. The module processing still water disposed inside the vessel is adapted to receive the water that flows out said module processing moving water and to contain it batchwise as a body of still water in fluid communication with said spout of said vessel, and is further adapted to provide UV radiation that is omnipresent to every region of each said body of still water contained batchwise therein with an intensity and a duration to neutralize organic impurities at every region of said body of still water contained batchwise therein. In this manner, water from which inorganic impurities have been removed and in which organic impurities have been neutralized may be dispensed through said spout of said portable, refillable and hand-holdable vessel.

Preferably, the portable, refillable and hand-holdable vessel includes a pitcher with an open mouth and side and bottom walls that provide a basin for containing and pouring still water, a handle to one side of the pitcher, and a lid removably mounted to said open mouth of said pitcher. The module processing moving water preferably includes a bucket mounted inside said pitcher with its mouth in fluid communication with said mouth of said pitcher having an ion exchange and activated carbon flow-through filter bed that is fed by gravity action with water to be processed that is poured batchwise into said bucket all at once. The module processing still water preferably includes a single UV line radiator upstanding in, and centrally disposed within, said basin of said pitcher and a battery-powered controller carried by the pitcher that includes a control panel and user interface, preferably located on its handle, operatively coupled to the single UV line radiator.

Preferably, the removable lid includes a fill opening, and a louvered disc valve cooperative therewith to allow water to be poured through the fill opening batchwise into the bucket of the moving water processing module while blocking direct viewing of the UV line radiator.

Operation of the presently preferred portable, refillable and hand-holdable water dispenser serving batches of water purified of organic and inorganic pollutants is elegantly straightforward. All that is needed is to pour water to be processed batchwise into the bucket of the moving water processing module either directly, when the lid is removed, or through the fill opening, when the lid is attached to the pitcher, and to start the processing sequence by actuation of the control panel and user interface. The controller of the still water processing module waits for a first time to allow the water to be processed that has been poured batchwise into the bucket to move through the moving water processing module flow-through filter to remove inorganic impurities therefrom, then actuates the UV line radiator for a second time to neutralize organic impurities in the body of still water contained batchwise in the basin of the still water processing module, after which time it provides an indication at the control panel that a batch of water purified of organic and inorganic pollutants is ready to be dispensed through the spout of the pitcher.

BRIEF DESCRIPTION OF THE DRAWINGS

These and other objects, inventive aspects and advantageous features of the present invention will become apparent as the invention becomes better understood by referring to the following, solely exemplary, detailed description of the presently preferred embodiments thereof, and to the drawings, wherein.

DETAILED DESCRIPTION OF THE PRESENTLY PREFERRED EMBODIMENTS

Figure 1:
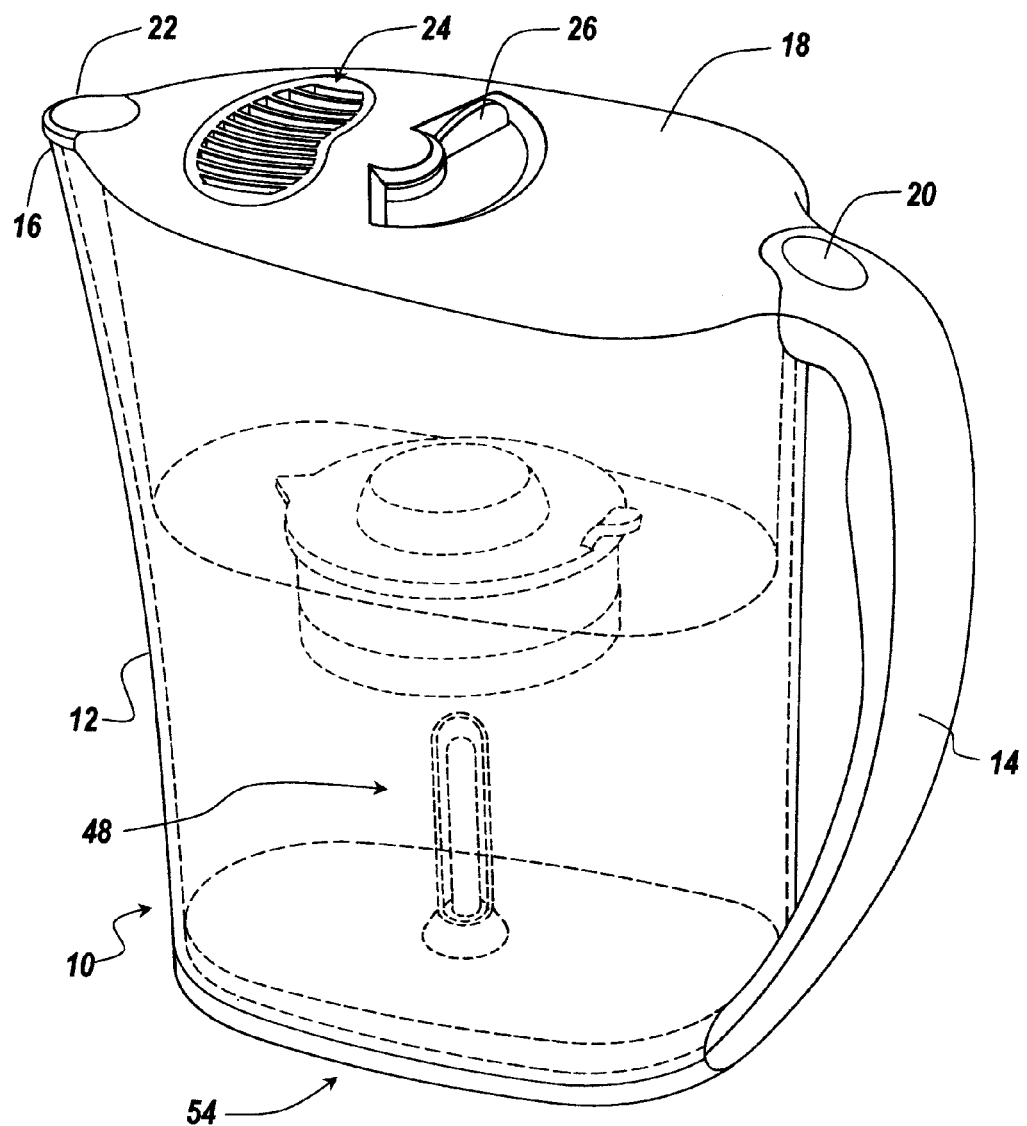
FIG. 1 is a perspective view of a portable, refillable water dispenser serving batches of water purified of organic and inorganic impurities in accord with the present invention.
Figure 2:
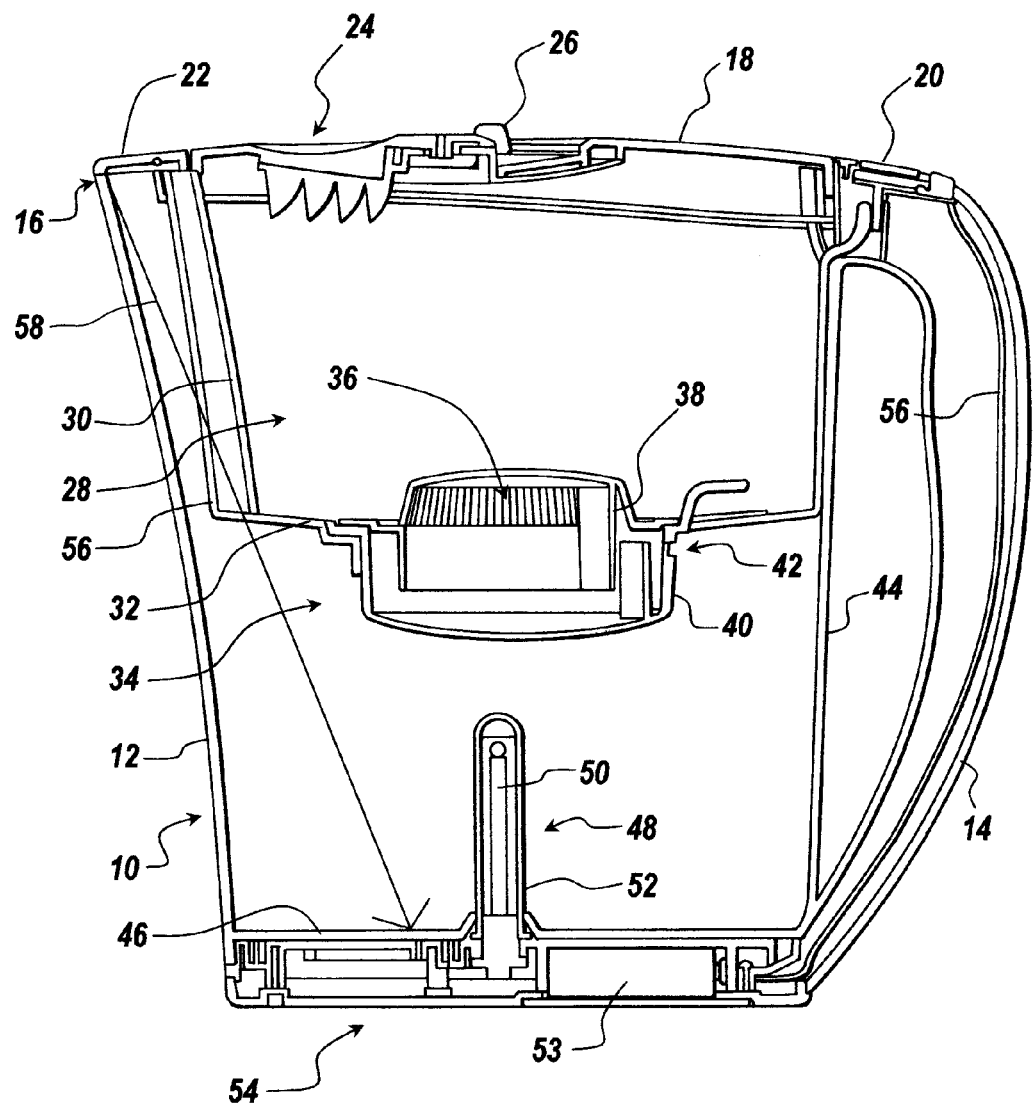
FIG. 2 is a longitudinal sectional view through the midsection thereof.

Referring now to FIGS. 1 and 2, generally designated at 10 is a portable, refillable water dispenser serving batches of water purified of organic and inorganic impurities in accord with the present invention. The portable, refillable water dispenser 10 includes a portable, refillable and hand-holdable pitcher 12 for containing, receiving and pouring water having a handle 14 to one side thereof, a pour spout 16 and a removable lid 18. Any portable, refillable water dispenser for receiving, containing and dispensing water such as a standalone, countertop water purifier, may be employed without departing from the inventive concepts. A control panel and user-interface 20 to be described is mounted on the handle 14. A flip lid 22, cooperative with the spout 16 of the pitcher 12, and a fill opening generally designated 24 and cooperative louvered disc valve to be described having actuation handle 26, are carried by the removable lid 18.

As best seen in FIG. 2, a bucket generally designated 28 is mounted inside the pitcher 12 having side and bottom walls 30, 32 that bound a volume whose capacity, when filled, accepts water to be purified poured batchwise all at once thereinto. A flow-through filter generally designated 34 is removably mounted in an opening provided therefor in the bottom wall 32 of the bucket 28 that is fed with water to be processed received batchwise in the bucket 28 by action of gravity. Water to be processed received batchwise by the bucket 28 flows into inlet ports generally designated 36 of flow-through filter 34, though ion exchange and activated carbon filter media, not shown, contained inside the walls of inner and outer cups 38, 40 to remove inorganic impurities, and out outlet port generally designated 42 at the top and to the side of flow-through filter 34 away from the spout 16 of the pitcher 12. Reference in this connection may be had to commonly assigned, co-pending United States utility patent application entitled "Filter Cartridge for a Standalone Point of Use Water Purification Device," filed on even date herewith, incorporated herein by reference. Any suitable moving water processing module adapted to receive water to be processed batchwise and further adapted to cause the water be processed received batchwise to move through a flow-through filter to remove inorganic impurities may be employed without departing from the inventive concepts, and a flow-through filter having other than an ion exchange and activated carbon flow-through filter media such as activated carbon block media, ceramic media, or semipermeable membranes, may be employed.

The pitcher 12 has side walls 44 and a contained bottom wall 46 that provide a basin in fluid communication with the spout 16 for receiving, holding and pouring water. The side walls 44 of the pitcher 12 are fashioned of a material that is transparent to ambient light and opaque to UV light, such as plastic. The capacity of the basin is at least as great as the capacity of the bucket 28.

A single UV line radiator generally designated 48 is upstanding in, and centrally positioned within, the basin of the pitcher 12. The UV line radiator 48 includes a two hundred fifty-four (254) nm cold cathode fluorescent lamp (CCFL) 50 and protective, UV transparent quartz sheath 52 mounted in water-tight sealing relation to the bottom wall 46 of the pitcher 12. The UV lamp 50 of the UV line radiator 48 is operatively connected to a controller to be described supplied by power from batteries 52 carried in an electronics pack generally designated 54 attached to the bottom wall 46 of the pitcher 12. The electronics pack 54 is connected to the control panel and user interface 20 via cable 56 that is threaded through the handle 14 of the pitcher 12.

Water to be processed received batchwise by the bucket 28 of the moving water processing module is received in the basin of the pitcher 12 as it flows streamwise through the flow-through filter 34 thereof, which, after all the water of a batch has flowed therethrough, is contained batchwise as a body of still water in the basin of the pitcher 12 in fluid communication with the spout 16. The body of still water contained batchwise in the basin completely submerges the UV line radiator 48. The CCFL 50, actuated by the controller in response to user control input to the control panel and user interface 20 in a manner to be described, provides UV radiation that is omnipresent to every region of the basin containing the body of still water received batchwise with an intensity and a duration to neutralize organic impurities at every region of the body of still water contained batchwise in the basin of the pitcher 12. The controller thereafter provides a signal indication at the control panel and user-interface 20 that a batch of water purified of organic and inorganic pollutants is ready for dispensation through spout 16. Any still water processing module adapted to receive water from the moving water processing module and contain it batchwise as a body of still water other than the basin of the pitcher 12 and further adapted to provide UV radiation that is omnipresent to every region of the body of still water received batchwise with an intensity and a duration to neutralize organic impurities at every region of the body of still water contained batchwise other than the battery-powered, single UV line radiator upstanding in, and centrally disposed within, the basin of the pitcher may be employed without departing from the inventive concepts.

Figure 3:
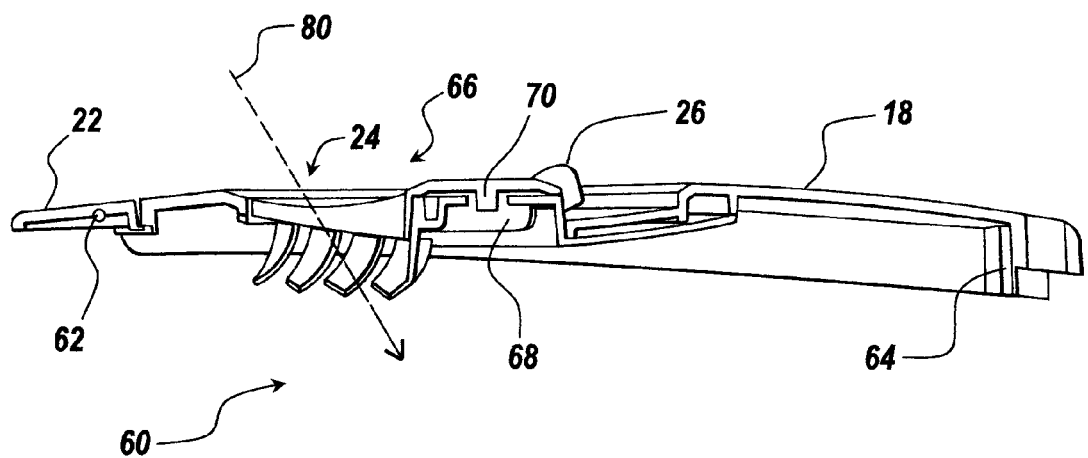
FIG. 3 is a longitudinal sectional view through the midsection of the removable lid of the portable, refillable water dispenser of FIGS. 1 and 2.

Referring now to FIG. 3, generally designated at 60 is a longitudinal view through the midsection of the removable lid 18 of the portable, refillable water dispenser serving batches of water purified of organic and inorganic pollutants in accord with the present invention. The flip lid 22 is pivotally mounted on an axle 62 best seen in FIG. 4. The flip lid 22 covers the pour spout 16 of the pitcher 12 while allowing water contained in the basin thereof to be dispensed therethrough. The bucket 28 includes a front wall 56 that intercepts the line of sight from the pour spout 16 to prevent direct viewing of the UV line radiator 48 in the basin of the pitcher 12 as schematically illustrated by arrow 58 in FIG. 2. A lid seat sensing switch 64, such as a magnetic reed switch, is mounted to the removable lid 18 to disable the UV line radiator 48 in the basin of the pitcher 12 when the removable lid 18 is off of the pitcher 12.

Figure 4:
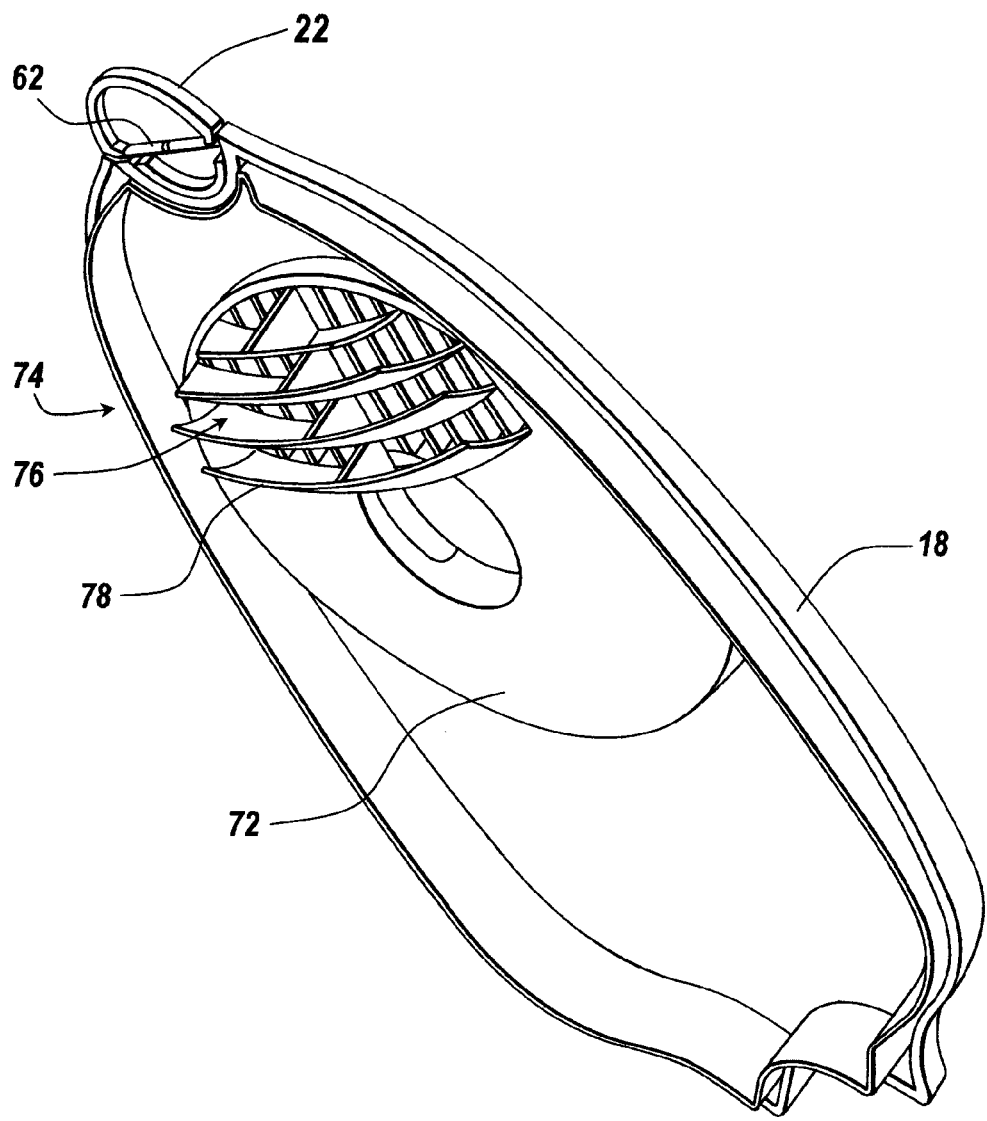
FIG. 4 is a bottom plan view of the removable lid.

A louvered disc valve generally designated 66 retained by cap 68 on rotary bearing 70 is mounted for rotation to the underside of the removable lid 18 adjacent the fill opening 24 thereof. The louvered disc valve 66 includes the actuation handle 26, and as best seen in FIG. 4, a disc valve 72 and a louver generally designated 74, whose opening generally designated 76 is provided with a series of slanted, radially spaced fins 78. Water received through fill opening 24 of the removable lid 18 with the louvered disc valve 66 rotated to its fully opened position illustrated in FIG. 4 by handle 26 flows through the louver opening 76 into the bucket 28 while the slanted fins 78 thereof block direct viewing of the UV line radiator 48 within the pitcher 12 as schematically illustrated by dashed arrow 80 in FIG. 3. As will be appreciated, the slanted fins 78 of the louvered disc valve 66 block direct viewing of the UV line radiator 48 inside the pitcher 12 when it is not in any of its non-fully-closed positions, not shown, which are not further described herein for the sake of brevity of exposition. Another mechanism that allows water to be processed to be received batchwise through the removable lid while blocking direct view of the UV radiator other than the louvered disc valve 66 may be employed without departing from the inventive concepts.

Figure 5:
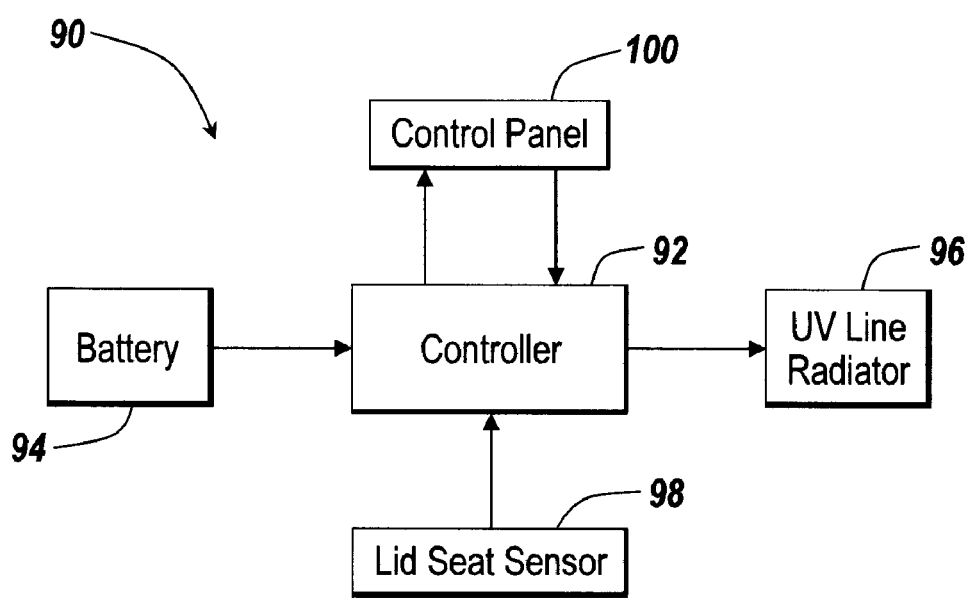
FIG. 5 is a block circuit diagram of the portable, refillable and hand-holdable water dispenser serving batches of water purified of organic and inorganic impurities in accord with the present invention.

Referring now to FIG. 5, generally designated at 90 is a block circuit diagram of the portable, refillable water dispenser serving batches of water purified of organic and inorganic pollutants in accord with the present invention. Controller 92, supplied with DC power from battery 94, is operatively coupled to UV line radiator 96. A lid seat sensor 98 is electrically connected to the controller 92. A control panel and user interface 100 is electrically connected to the controller 92. The controller 92 may be powered by AC line power or a combination of AC and rechargeable DC without departing from the inventive concepts.

In operation, the controller 92 in response to sequence initiation input via the control panel and user interface 100 waits a first time to allow water to be processed received batchwise in the bucket to move through the moving water processing module and into the basin of the pitcher where it is contained as a body of still water. For an exemplary thirty-two (32) ounce capacity bucket, water received batchwise takes about takes about ten (10) minutes to drip through its flow-through filter. After the first time lapses, the controller 92 actuates the UV line radiator 96 to provide UV radiation that is omnipresent to every region of the body of still water contained in the basin of the still water processing module with an intensity and a second time duration to neutralize organic impurities at every region of the body of still water contained in the basin of the still water processing module. Different second time durations may be selected for "city" versus water from wells or other sources. For an exemplary thirty-two (32) ounce capacity basin, five (5) minutes of irradiation neutralizes organic impurities in "city" water and ten (10) minutes neutralizes organic impurities in well water. If at any time during the processing sequence (or at any other time) a signal is detected from the lid seat sensor 98, the controller disables the UV line radiator 96 and resets its water treatment sequence. Otherwise, after the second time has elapsed, the controller 92 provides a signal indication at the control panel and user interface 100, such as by illuminating a light or causing an audio signal to sound, that a batch of water purified of organic and inorganic pollutants is ready to be served through the spout of the pitcher. The controller monitors the time since it was last actuated, and if a predetermined third time elapses, such as twenty-four (24) hours, since it was last actuated, it provides a signal indication at the control panel and user interface to retreat the batch of water.

Many modifications of the presently disclosed invention will become apparent to those of skill in the art without departing from the inventive concepts.

What is claimed is:

1. A refillable water dispenser serving batches of water purified of organic and inorganic impurities, comprising:

a water pitcher having an open top, side and bottom walls enclosing a basin for holding still water, a spout in fluid communication with the basin for pouring water, and a removable lid mounted to the open top of the pitcher;

a moving water processing module including a bucket mounted inside the water pitcher having an open top in fluid communication with the open mouth of the pitcher and having side and bottom walls that enclose a volume whose capacity, when filled, accepts a batch of water to be treated that is poured all at once thereinto, a flow-through filter removably mounted to said bucket bottom wall that is fed with the water of each batch of water by action of gravity, said flow-through filter including filter media that acts to remove non-living organic (carbon) and inorganic impurities as said water flows therethrough and to streamwise discharge that water into said basin; and a still water processing module including a UV line radiator disposed within the basin of the pitcher operative after all of the water of a batch of water has been discharged streamwise from the moving water processing module and received by the basin of the pitcher which contains it batchwise as a body of still water to provide UV radiation that is omnipresent to every region of the body of still water contained batchwise by the basin with an intensity and a duration to neutralize living organism organic impurities at every region of the body of still water contained batchwise by the basin, and, thereafter, to provide a signal indication that a batch of water purified of living and nonliving organic and inorganic pollutants is ready to be served through the spout of the pitcher;

wherein the removable lid includes a fill opening therethrough, and a mechanism cooperative therewith to allow water to be received through said fill opening but to block direct viewing of UV radiation within said pitcher;

wherein said mechanism includes a louvered disc valve.

2. The refillable water dispenser serving batches of water purified of organic and inorganic pollutants of claim 1, wherein said flow-through filter media is an ion exchange ands activated carbon flow-through filter.

3. The refillable water dispenser serving batches of water purified of organic and inorganic pollutants of claim 1, wherein said UV line radiator of said still water processing module is upstanding in, and centrally disposed within, said basin.

4. A water dispenser serving batches of water purified of organic and inorganic pollutants comprising:

a water pitcher having an open top, side and bottom walls enclosing a basin for holding still water, a spout in fluid communication with the basin for pouring water, and a removable lid mounted to the open top of the pitcher;

a moving water processing module including a bucket mounted inside the water pitcher having an open top in fluid communication with the open mouth of the pitcher and having side and bottom walls that enclose a volume whose capacity, when filled, accepts a batch of water to be treated that is poured all at once thereinto, a flow-through filter removably mounted to said bucket bottom wall that is fed with the water of each batch of water by action of gravity, said flow-through filter including filter media that acts to remove non-living organic (carbon)

and inorganic impurities as said water flows therethrough and to streamwise discharge that water into said basin; and a still water processing module including a UV line radiator disposed within the basin of the pitcher operative after all of the water of a batch of water has been discharged streamwise from the moving water processing module and received by the basin of the pitcher which contains it batchwise as a body of still water to provide UV radiation that is omnipresent to every region of the body of still water contained batchwise by the basin with an intensity and a duration to neutralize living organism organic impurities at every region of the body of still water contained batchwise by the basin, and, thereafter, to provide a signal indication that a batch of water purified of living and nonliving organic and inorganic pollutants is ready to be served through the spout of the pitcher;

further including a lid seat sensor to disable the UV line radiator in the basin of the pitcher when the removable lid is off of the pitcher.

* * * * *